United States Patent [19]

Kling et al.

[11] Patent Number: 4,909,132

[45] Date of Patent: Mar. 20, 1990

[54] CURVED SUPPORTING ELEMENTS FOR JOINING PISTON PIN BOSSES TO PISTON HEAD OF INTERNAL COMBUSTION ENGINE PISTON

[75] Inventors: Wolfgang Kling, Graz; Ernst Gschweitl, Gleisdorf, both of Austria

[73] Assignee: AVL Gesellschaft fur Verbrennungskraftmaschinen und Messtechnik mbH Prof. Dr. Dr. h. c. Hans List, Graz, Austria

[21] Appl. No.: 231,683

[22] Filed: Aug. 12, 1988

[30] Foreign Application Priority Data

Aug. 17, 1987 [AT] Austria .................................. 2067/87

[51] Int. Cl.[4] .......................... F02F 3/00; F02F 3/28; F16J 1/16

[52] U.S. Cl. .......................................... 92/190; 92/238; 92/239

[58] Field of Search ................. 92/187, 189, 190, 208, 92/216, 238, 239, 255; 123/193 P

[56] References Cited

U.S. PATENT DOCUMENTS

| | | | |
|---|---|---|---|
| 2,035,692 | 3/1936 | Dietrich | 92/238 X |
| 4,207,808 | 6/1980 | Elsbett et al. | 92/190 X |
| 4,256,022 | 3/1981 | Elsbett et al. | 92/190 |
| 4,377,967 | 3/1983 | Pelizzoni | 92/216 X |
| 4,593,660 | 6/1986 | Elsbett et al. | 92/216 X |
| 4,644,853 | 2/1987 | Russell et al. | 92/190 |
| 4,781,159 | 11/1988 | Elsbett et al. | 92/239 X |

FOREIGN PATENT DOCUMENTS

| | | | |
|---|---|---|---|
| 37786 | 1/1931 | France | 92/238 |
| 2315005 | 1/1977 | France | 123/193 P |
| 2200718 | 8/1988 | United Kingdom | 123/193 P |

OTHER PUBLICATIONS

Elsbett, K. et al., "The Ferrum Piston For Diesel Engines-A Two-piece Articulated Piston Design", SAE Paper 850505, 8/1985, pp. 79-85.

*Primary Examiner*—Robert E. Garrett
*Assistant Examiner*—George Kapsalas
*Attorney, Agent, or Firm*—Watson, Cole, Grindle & Watson

[57] ABSTRACT

In order to achieve less deformation under gas pressure load and also under thermal load, the bottom piece of a piston with ring-carrying barrel is configured as a supporting cone tapering towards the piston pin and connected with the piston pin bosses by means of supporting elements. Cone, bosses and supporting elements are made in one piece. The supporting elements comprise walls extending essentially parallel to the axis of the piston pin. First distance (A) to the outer perimeter of the piston in the direction of the piston pin axis (Y—Y) are greater than the corresponding second distances (B) normal to this axis. The end parts of the walls are curved inwardly and leave open an area around an axis (X—X) normal to the piston pin axis.

4 Claims, 1 Drawing Sheet

CURVED SUPPORTING ELEMENTS FOR JOINING PISTON PIN BOSSES TO PISTON HEAD OF INTERNAL COMBUSTION ENGINE PISTON

BACKGROUND OF THE INVENTION

1. Field of the Invention

This invention relates to a piston for internal combustion engines, comprising a rotational-symmetric barrel carrying the piston rings, with a bottom piece which on one side is configured as a supporting cone tapering towards the two piston pin bosses placed at a distance from each other, and on the other side as a combustion recess, the supporting cone and the piston pin bosses being joined by supporting elements cast integral with the former, and further comprising a guide shoe or piston skirt.

2. Description of the Prior Art

A one-piece piston of this type is known, which is characterized by the disadvantage that the guide shoe and the rest of the piston cannot be made from different materials, for example, iron and aluminium. The main disadvantage of this piston, however, is its tendency to deteriorate or fail under its high thermal and mechanical operating loads. In this piston the extremely high pressure loads of the piston bottom are transmitted via a supporting base in the shape of a hollow cylinder attached to the piston bottom, which extends downwardly from the piston bottom to the piston pin bosses, the only exception to its cylindrical form being two curved openings between the bosses situated at an angle of 90 degrees to the boss-axis. The flexural stiffness of the piston thus is approximately the same both in the direction of the piston axis and in the direction normal to this axis, with the consequence that during operation the piston is subject to undesirable deformations in the direction normal to the piston pin axis, or - if this is to be avoided - that the overall dimensions of the piston must be increased. This kind of support of the piston bottom also results in an undesirably high degree of heat transfer between piston bottom and piston pin bosses, which ideally should be kept as small as possible.

SUMMARY OF THE INVENTION

It is the object of the present invention to avoid the above disadvantages and to achieve a balanced measure of piston deformation in all directions under gas pressure and thermal load, as well as to reduce the piston volume as compared to conventional aluminium pistons.

According to the invention this is achieved by configuring the supporting elements as walls extending essentially parallel to the piston pin axis, whose distances (A) from the outer perimeter of the piston in the direction of the piston pin axis are larger than the corresponding distances (B) normal to this axis, and whose end parts are curved inwardly, leaving openings in an area around the axis (X—X) normal to the piston pin axis. The different section moduli in the direction of the piston pin axis and in the direction normal to this axis achieved in this manner, lead to appreciably smaller deformations under gas pressure as well as under thermal load.

Due to the more homogeneous load distribution achieved in this way the piston may be designed with reduced thickness and smaller volume.

A further development of the invention provides that the piston pin bosses be rounded off in their longitudinal direction by a radius (R), which is smaller than the exterior diameter of the piston. This will give an additional improvement as the length of the piston pin may be further reduced.

The invention may also provide the addition of one window each in the wall area above the piston pin axis and below the supporting cone, in order to reduce stiffness in the direction along the piston pin and heat transfer towards the piston pin.

Finally, the invention may provide as a further feature that the edge along which the supporting cone meets the bottom of the combustion chamber be configured with the minimum radius achievable in casting, giving an angular exterior shape of the supporting cone, which will result in the maximum stiffness possible.

BRIEF DESCRIPTION OF THE DRAWINGS

Following is a more detailed description of the invention as illustrated by the accompanying drawings, in which.

DETAILED DESCRIPTION OF A PREFERRED EMBODIMENT

Figure 1:
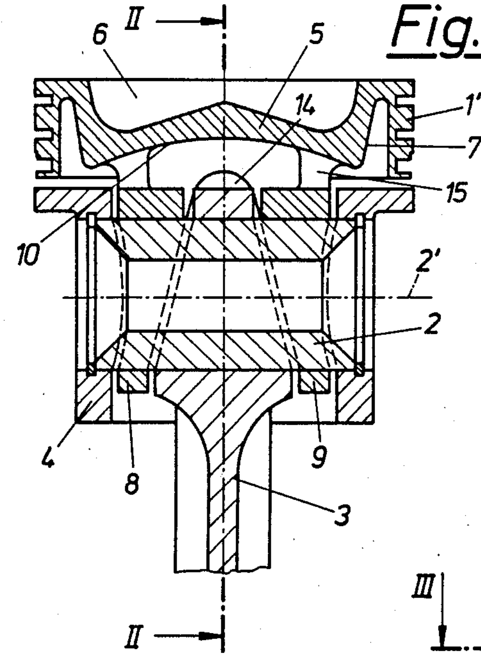
FIG. 1 shows an axial section of a piston according to the invention, as indicated by line I—I in FIG. 3.

The piston comprises an upper part 1, preferably made from steel or cast iron and designed to transmit the gas-generated force via the piston pin 2 and the connecting rod 3 to the crank gear of the combustion engine. The piston is guided in the cylinder liner by the guide shoe or skirt 4, which is preferably made from light alloy for reasons of weight.

The ring-carrying barrel 1' has a bottom piece 5, which is configured as a combustion recess 6 on its upper side, while its lower side forms a supporting cone 7, with a vault-shaped bottom surface 10. Transmission of the gas-generated force acting on the bottom piece 5 to the piston pin 2 is achieved via the supporting cone 7 and the two piston pin bosses 8 and 9. The supporting cone 7 is connected with the piston pin bosses 8 and 9 by means of the curved walls 11 and 12, cone and bosses being made in one piece. First distances A of said walls 11 and 12 to the outer perimeter 13 of the piston are larger than the corresponding second distances B normal to the piston pin axis 2'. The end parts 11' and 12' of walls 11 and 12 are curved in the direction of axis X—X on the pressure/counter-pressure side of the piston, in order to support the supporting cone 7. It is essential that no ribs be left standing in the area 14 of axis X—X.

In the area of axis Y—Y the walls 11 and 12 have windows 15, which decrease flexural stiffness in the direction of the piston pin axis 2' and at the same time reduce the heat flow towards the piston pin bosses.

Figure 2:
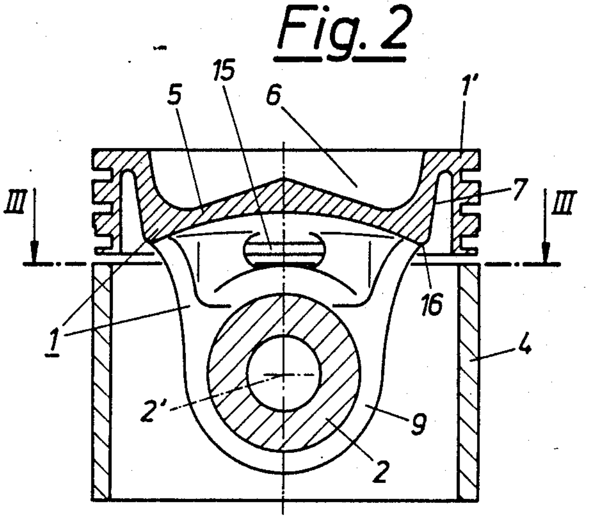
FIG. 2 shows a section as indicated by line II—II in FIG. 1.
Figure 3:
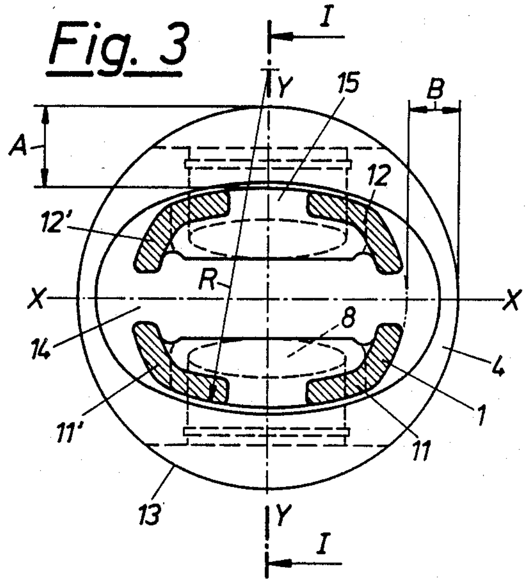
FIG. 3 shows a section as indicated by line III—III in FIG. 2.

The supporting cone 7 should have as angular an exterior shape as possible see FIGS. 1 and 2 in order to achieve maximum stiffness. For this purpose the edge 16 of the supporting cone 7 has the minimum radius achievable in casting.

We claim:

1. A piston for internal combustion engines, comprising two piston pin bosses respectively spaced on opposite sides of a piston pin axis, a rotational symmetric barrel carrying piston rings, and a bottom piece configured as a supporting cone tapering towards said two piston pin bosses and forming a combustion recess, said supporting cone and said piston pin bosses being joined by integral supporting elements, and further comprising a guide shoe or piston skirt, wherein said supporting elements comprise walls extending essentially parallel to said piston pin axis, first distances A of said walls to the outer perimeter of said piston in the direction of said piston pin axis are larger than said corresponding second distances B normal to said piston pin axis, and wherein end parts of said walls are curved inwardly, leaving open an area around an axis normal to said piston pin axis.

2. A piston according to claim 1, wherein said piston pin bosses are rounded off in their longitudinal direction by a radius R, which is smaller than the exterior diameter of said piston.

3. A piston according to claim 1, wherein each of said walls comprises a window situated in an area above said piston pin axis and below said supporting cone, in order to reduce stiffness in direction of said piston pin axis and heat transfer towards said piston pin bosses.

4. A piston according to claim 1, wherein an edge along which said supporting cone meets said bottom piece of said combustion chamber, is configured with the minimum radius achievable in casting.

* * * * *